United States Patent [19]
Fidi

[11] 3,754,745
[45] Aug. 28, 1973

[54] ARRANGEMENT FOR THE MECHANICAL DAMPING OF COIL SPRINGS IN DEVICES FOR THE PRODUCTION OF ARTIFICIAL REVERBERATION

[75] Inventor: Werner Fidi, Baden near Vienna, Austria

[73] Assignee: AKG Akustische u. Kino-Gerate, Vienna, Austria

[22] Filed: Jan. 28, 1972

[21] Appl. No.: 221,583

[30] Foreign Application Priority Data
Mar. 19, 1971 Austria .......................... A 2414/71

[52] U.S. Cl. .................................. 267/136, 267/161
[51] Int. Cl. ................................................. F16f 7/00
[58] Field of Search .................... 267/136, 161, 160, 267/137, 134, 150, 166, 180

[56] References Cited
UNITED STATES PATENTS
1,867,708   7/1932   Paton ................................. 267/136
3,344,397   9/1967   Elliott et al. ......................... 267/161

Primary Examiner—James B. Marbert
Attorney—John J. McGlew et al.

[57] ABSTRACT

A spring arrangement, for use in an artificial reverberation device, includes a mechanically damped, torsionally vibratory, helical spring which is sub-divided into at least two spring portions. Each pair of adjacent spring portions is interconnected by a rigid spindle extending therebetween along the longitudinal axis of the two portions. A damping plate on each spindle lies in a plane substantially perpendicular thereto, and is embraced by a pair of resilient pads engaging opposite surfaces of the plate, the resilient pads preferably comprising foamed plastic. A pair of rigid diaphragm-like clamping members press the pads therebetween so that the damping plate is clamped between the pads. The pressure applied to the pads is preferably adjustable, and the damping members have apertures through which the spindle extends, with these apertures having a diameter smaller than that of the helical spring. The damping plate may have various configurations.

12 Claims, 6 Drawing Figures

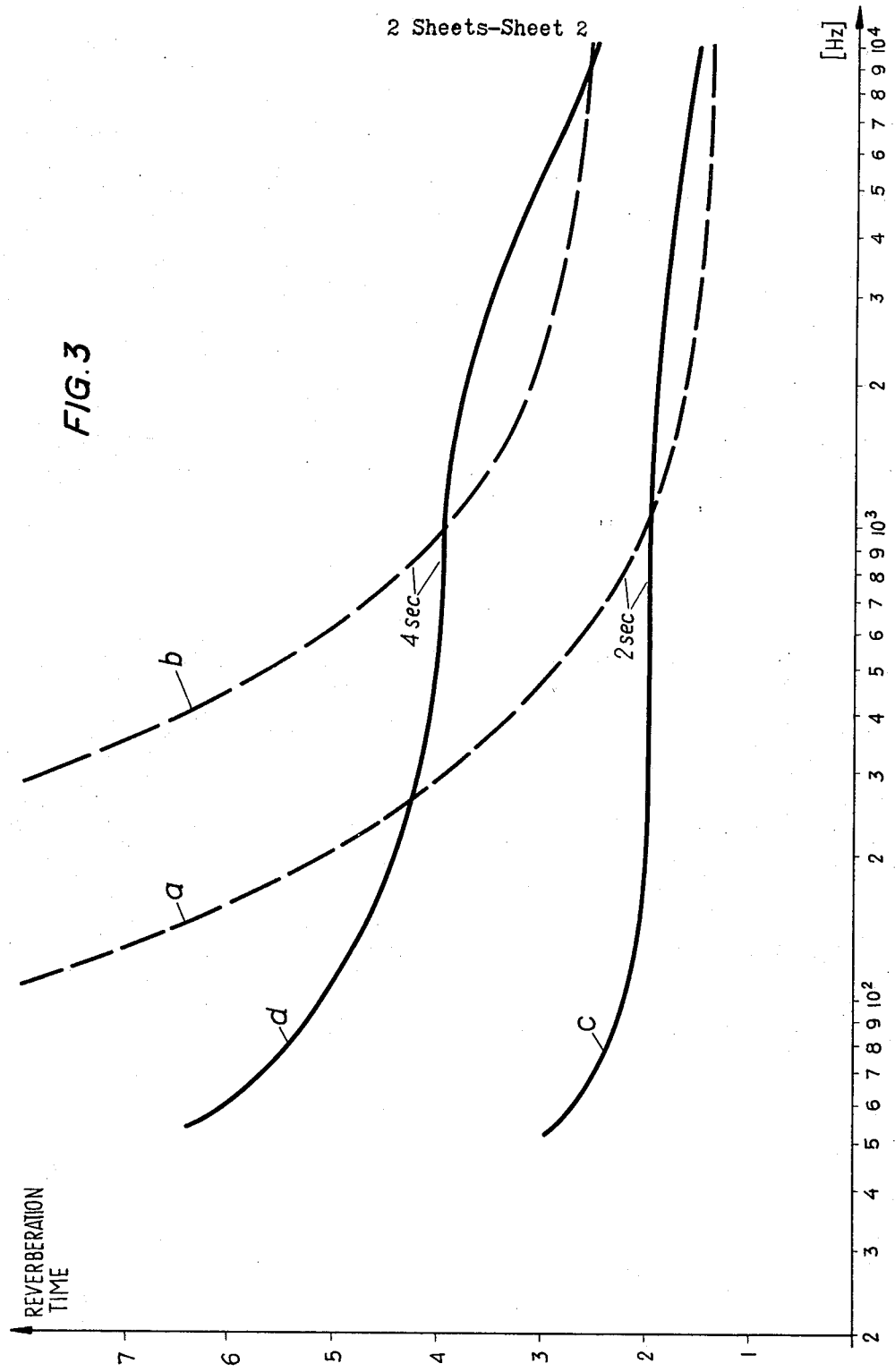

ARRANGEMENT FOR THE MECHANICAL DAMPING OF COIL SPRINGS IN DEVICES FOR THE PRODUCTION OF ARTIFICIAL REVERBERATION

FIELD OF THE INVENTION

This invention relates to spring arrangements for use in artificial reverberation devices and, more particularly, to a novel mechanically damped spring arrangement including a torsionally vibratory helical spring, and which fulfills all the desirable criteria for damping.

BACKGROUND OF THE INVENTION

A requirement which high quality artificial echo devices, or artificial reverberation devices, are required to meet is the provision of steplessly variable echo or reverberation time over very wide ranges. Conventionally, the reverberation time is adjusted by motional feed back, that is, an electrical signal is derived from one or more points on the spring, is amplified, and then is fed back in phase opposition to the respective point from which it was derived, based on the premise that spring damping varies with the extent of signal amplification.

The disadvantage of this basically electrical form of damping is its limited range of adjustment of, for example, only up to about two seconds in a system whose undamped echo or reverberation time is about five seconds. A further factor which must be considered in this connection is the necessary statistical transmission properties of the spring as produced by the spring manufacturing process. A further disadvantage of this form of damping is that, particularly with short echo or reverberation times, there is excessive echo or reverberation growth at low frequencies, so that the artificial echo or reverberation ceases to correspond to the ideal pattern.

To obviate these disadvantages, further procedures are required to damp the helical spring so as to reduce the echo or reverberation time, more particularly at low frequencies. This extra or additional damping should meet the following criteria:

1. The extra damping should increase toward low frequencies and have negligible effect on high frequencies, more particularly those above 500 Hz.
2. The damping should be such that friction predominates over impedance, as otherwise the reflections produced at the damping points are bound to affect the sound pattern adversely.
3. The extra damping should provide substantially the same amount of damping of all forms of vibration in the spring.
4. The damping should be such that the spring can be mechanically protected, that is, the damping means should have the helical springs so located that, when the system is not in use, vibration, occurring for example during transportation, cannot damage the spring.

For the sake of simplicity and economy, purely mechanical means are preferred for producing the extra damping. For instance, it is known to embed the moving parts of a recording or playback system directly in damping material, or to provide, very near the recording and/or playback systems, a rubber plug through which the spring suspension wire extends in frictional engagement therewith. However, none of these known systems simultaneously fulfills all four of the requirements listed above.

SUMMARY OF THE INVENTION

In accordance with the present invention, there is provided, for an artificial echo or reverberation device, a spring arrangement including a torsionally vibratory helical spring which is mechanically damped. In this spring arrangement, the spring is subdivided into at least two spring portions, and a respective rigid spindle extends between each pair of adjacent spring portions to rigidly interconnect the same along their longitudinal axis. The spindle carries a damping plate lying in a plane perpendicular to the spindle, and which is located or pressed between two resilient pads formed, for example, of foamed plastics. These pads are disposed between a pair of rigid diagram-like clamping members that serve to clamp the damping member or plate between the resilient pads.

Preferably, the pressure applied by the damping members to the damping plates through the resilient pads can be varied or adjusted, so that accurate adjustment or control is possible. If necessary, an externally accessible control knob can be provided for varying the pressure applied to the damping plate.

Each of the damping members has an aperture through which the associated spindle extends and, in accordance with another preferred feature of the invention, the aperture in each damping member is smaller than the diameter of the spring, preferably by about 20 percent.

While the damping plate conveniently can comprise a disk or disk-like member having a diameter of approximately one-third of the diameter of the spring, the damping plate can have a shape other than a disk-like shape. For example, the damping plate may be in the form of a four-pointed stellate member having rounded points, or of a member having three spoon-shaped arms disposed at angular spacings of 120° from each other. The damping plate also may have the form of a wheel with three spokes, or can be a member having two spoon-shaped arms extending in opposite radial directions to each other, and which have a shape ressembling that of a delicacy known as a "lady finger."

In any case, the invention provides a large number of possible ways of damping helical spring arrangements for echo or reverberation devices, and therefore is capable of use for a wide variety of purposes.

Stated briefly, the fundamental principle of operation of a damping system of the kind described is that, at low frequencies, much of the foamed plastics of the resilient pads co-oscillates, with surface friction providing the necessary coupling between the damping plate and the foamed plastics material. The internal friction of the foamed plastics materials consequently is coupled into the system, and such friction is determined by the choice of material and its porosity, as adapted to requirements. Since the region of co-oscillation becomes confined more closely to the damping plate in proportion to the increase in frequency, less friction is coupled to the spring as the frequency increases, and so the resulting damping has the required frequency characteristic.

As already mentioned, the damping characteristics can be determined by the choice of foamed plastics. Other parameters affecting damping are the parameters of the damping plate such as its diameter, surface texture, shape, and the like, all of which can be varied or adapted to suit prevailing circumstances.

For effecient production, the disk-like form of the damping plate usually is employed, and its diameter and, where applicable, surface texture first can be varied in efforts to attain the required damping characteristics. It is only if none of these efforts prooves fruitful, that a shape other than a disk, such as a star or a wheel, is chosen for the damping plate.

An object of the invention is to provide an improved spring arrangement for use in an artificial reverberation device.

Another object of the invention is to provide such a spring arrangement including a mechanically damped, torsionally vibratory helical spring sub-divided into at least two spring portions with adjacent portions interconnected by respective rigid spindles which are associated with damping means.

A further object of the invention is to provide such a spring arrangement in which each spindle carries a damping plate lying in a plane substantially perpendicular thereto and engaged by a pair of resilient pads pressed thereagain by a pair of rigid diaphragm-like clamping members.

For an understanding of the invention, reference is made to the following description of typical embodiments thereof as illustrated in the accompanying drawing.

BRIEF DESCRIPTION OF THE DRAWING

In the drawing:

FIG. 3 is a graphical illustration of the improvement in the performance of reverberation devices provided by the present invention.

DESCRIPTION OF THE PREFERRED EMBODIMENTS

Figure 1:
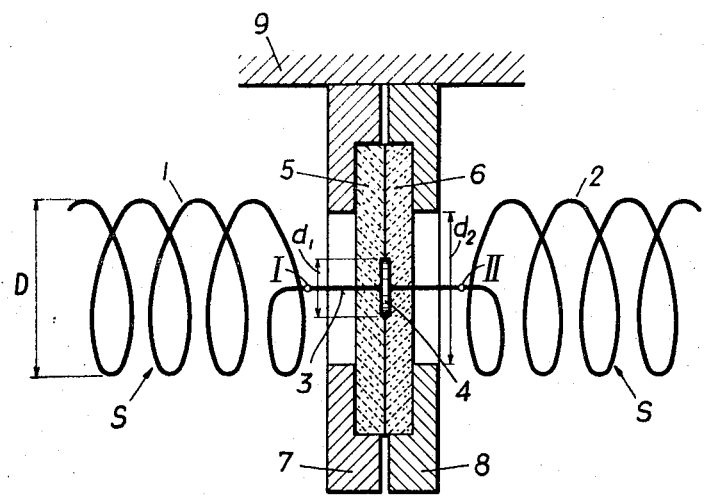
FIG. 1 is a cross sectional view through a spring arrangement embodying the invention.

Referring to FIG. 1, a spring arrangement embodying the invention is illustrated as including a helical spring S which is subdivided into two spring portions 1 and 2. The last convolution of each portion is bent so as to terminate at a respective point I or II disposed on the axis of spring S. A thin rigid spindle, staff, arbor, or the like 3, is positioned between points I and II and rigidly interconnects the two spring portions 1 and 2.

A thin damping disk 4, having a diameter $d_1$ equal to about one-third of the spring diameter D, is secured substantially centrally of spindle 3. Foamed plastics pads 5 and 6 are disposed adjacent and in contact with opposite surfaces of disk 4, and are enclosed between diaphragm-like annular damping members 7 and 8 which retain pads 5 and 6 in position.

The term "diaphragm-likemember" or "diaphragm" is applied to damping members 7 and 8 because satisfactory damping of the spring arrangement embodying the invention depends, to some degree, upon the diameter $d_2$ of the aperture in each member 7 and 8 and through which the spindle 3 extends. If this aperture is too large, pads 5 and 6 may not contact disk 3 satisfactorily and, if the aperture is too small, there may be difficulty in assembly and snags in operation as well, should spindle 3 touch the edge of the aperture in a diaphragm 7 or 8. For optimum operation, diameter $d_2$ of each diaphragm aperture is approximately 20 percent smaller than the diameter D of spring S.

In the illustrated arrangement, diaphragms 7 and 8 are rigidly connected with a stationary part 9 of the echo or reverberation device. Preferably, however, only one diaphragm is fixedly mounted, with the other diaphragm being movable so that pads 5 and 6 can be adjusted to vary the pressure with which the contact disk 4. The simplest arrangement for doing this comprises screws extending through apertures in one diaphragm and engaged in tapped apertures in the other. However, any other convenient, or even more complicated, system can be used, if for example, it is desired to be able to adjust the diaphragms without manipulation inside the echo or reverberation device.

Figure 2A:
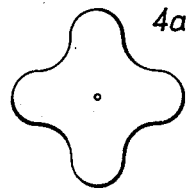
FIGS. 2a-2d are plan views illustrating various shapes for the damping plate used in the arrangement of FIG. 1.
Figure 2B:
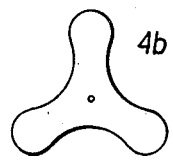
Figure 2C:
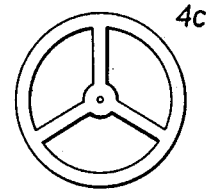
Figure 2D:
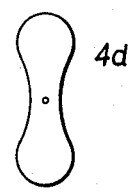

As mentioned above, most requirements usually can be met by means of a thin disk member 4, and it is only in exceptional cases that any other shape is needed. FIGS. 2a-2d illustrate other shaped for the member 4, and which may be more suitable for some purposes. Thus, the member 4a shown in FIG. 2a is a four-pointed star whose tips or points are rounded. The shape 4b shown in FIG. 2b is a thin member having three spoon-shaped arms spaced angularly 120° from each other, while the shape 4c shown in FIG. 2c resembles a wheel having three spokes. The shape 4d shown in FIG, 2d has two spoon shaped arms extending along a common diameter in opposite direction and resembles a sponge finger or a "lady finger."

Conveniently, in assemblying the spring arrangement of FIG. 1, the two pads 5 and 6 are pushed onto spindle 3 on opposite sides of disk 4, so that the spindle 3 extends through the foamed plastics. Diaphragms 7 and 8 are then threaded on and this assembly is soldered in position between spring ends I and II, thus assuring that pads 5 and 6 locate spring S radially and axially so that the required location of spring S, in all directions, is provided virtually automatically. The diaphragms may be formed with narrow radial slots enabling them to be mounted on spring S subsequently and, in this case, the diaphragms 7 and 8 need not be threaded on spindle 3 before the latter is soldered to spring S.

In practice, a spring arrangement embodying the invention is used in echo or reverberation devices having electrical damping variation, for example, of the motional feed back kind mentioned briefly above. The curves of FIG. 3 illustrate the advantages provided by the spring arrangement of the invention.

Referring to FIG. 3, broken line curves a and b show the echo or reverberation time/frequency relationship of a device using only motional feed back electrical adjustment with curve a corresponding to a reverberation time setting of two seconds and curve b corresponding to a reverberation time setting of four seconds. Both curves a and b have a sharp rise at low frequency, which is a feature which greatly detracts from the naturalness of the artificial echo or reverberation sound.

Curves c and d illustrates the improvements provided by the extra mechanical damping incorporated in the invention spring arrangement when used in an echo or reverberation device also having electrical motional feed back echo or reverberation time adjustment. The echo or reverberation times for curves c and d are two seconds and four seconds, respectively, as in the case of curves a and b, respectively. However, curves c and d have a pattern which correlates very closely with the curves of a natural sound space, and in regard to which it is approximately true to state that, as the echo or reverberation time increases, the increase is greater for low frequencies than for high frequencies.

The illustrated curves are for measurements with peak noise in the tertiary band width, the echo or reverberation times mentioned being obtained at a central frequency of 1000Hz.

While specific embodiments of the invention have been shown and described in detail to illustrate the application of the principles of the invention, it will be understood that the invention may be embodied otherwise without departing from such principles.

What is claimed is:

1. A spring arrangement, for use in an artificial reverberation device, comprising, in combination, a mechanically damped, torsionally vibratory, helical spring, said spring being sub-divided into at least two spring portions; a respective rigid spindle extending between the two adjacent spring portions of each pair thereof, and rigidly interconnecting the two adjacent spring portions along their longitudinal axis; a damping plate secured on each spindle and lying in a plane substantially perpendicular thereto; a pair of resilient pads engaging respective opposite surfaces of said plate; and a pair of rigid diaphragm-like clamping members pressing said pads therebetween, said damping members damping the damping plate between said pads.

2. A spring arrangement, as claimed in claim 1, in which said pads comprise foamed plastics material.

3. A spring arrangement, as claimed in claim 2, in which the pressure applied to said resilient pads by said damping members is variable.

4. A spring arrangement, as claimed in claim 2, in which the pressure applied to said resilient pads by said damping members is adjustable.

5. A spring arrangement, as claimed in claim 2, wherein said damping members are angular members having apertures through which said spindle extends; the diameter of said apertures being less than that of said helical spring.

6. A spring arrangement, as claimed in claim 5, in which the diameter of said apertures is 20 percent less than the diameter of said helical spring.

7. A spring arrangement, as claimed in claim 2, in which the damping plate is a disk-like member.

8. A spring arrangement, as claimed in claim 7, in which the diameter of said damping plate is about one-third of the diameter of said helical spring.

9. A spring arrangement, as claimed in claim 2, wherein said damping plate is a 4-pointed stellate member having rounded points.

10. A spring arrangement, as claimed in claim 2, in which said damping plate has three spoon-shaped arms spaced angularly 120° from each other.

11. A spring arrangement, as claimed in claim 2, in which said damping plate is in the form of a wheel having three spokes.

12. A spring arrangement, as claimed in claim 2, in which said damping plate comprises two arms extending diametrically in opposite directions from each other.

* * * * *